(12) United States Patent
Kojo

(10) Patent No.: US 9,760,812 B2
(45) Date of Patent: Sep. 12, 2017

(54) IMAGE FORMING APPARATUS THAT ENSURES REDUCED DETERIORATION OF IMAGE QUALITY CAUSED BY DRIVING OF FIXING PRESSURE CHANGING MECHANISM, IMAGE FORMING METHOD, AND RECORDING MEDIUM

(71) Applicant: Kyocera Document Solutions Inc., Osaka (JP)

(72) Inventor: Hidehiko Kojo, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 15/167,999

(22) Filed: May 28, 2016

(65) Prior Publication Data

US 2016/0350628 A1 Dec. 1, 2016

(30) Foreign Application Priority Data

May 28, 2015 (JP) ................................. 2015-109053

(51) Int. Cl.
*G06K 15/12* (2006.01)
*H04N 1/04* (2006.01)
*H04N 1/00* (2006.01)
*H04N 1/031* (2006.01)
*H04N 1/06* (2006.01)

(52) U.S. Cl.
CPC ..... *G06K 15/1219* (2013.01); *H04N 1/00795* (2013.01); *H04N 1/0313* (2013.01); *H04N 1/04* (2013.01); *H04N 1/06* (2013.01); *H04N 2201/0094* (2013.01)

(58) Field of Classification Search
None
See application file for complete search history.

(56) References Cited

U.S. PATENT DOCUMENTS 6,137,600 A * 10/2000 Sakurai ................ B41J 11/0095
 358/401
2006/0028671 A1* 2/2006 Katayanagi ........ G03G 15/0121
 358/1.14

FOREIGN PATENT DOCUMENTS

JP 2006-003415 A 1/2006

* cited by examiner

*Primary Examiner* — Thomas D Lee
(74) *Attorney, Agent, or Firm* — James Judge

(57) ABSTRACT

An image forming apparatus includes a fixing unit, an image reading unit, and a control unit. The fixing unit includes a first roller, a second roller, and a displacement mechanism that displaces at least one of the first roller and the second roller to form a nip portion. The image reading unit includes a scanning mechanism that scans by moving a carriage where a light source is mounted. The control unit executes a driving of the scanning mechanism and a driving of the displacement mechanism at different times.

6 Claims, 6 Drawing Sheets

IMAGE FORMING APPARATUS THAT ENSURES REDUCED DETERIORATION OF IMAGE QUALITY CAUSED BY DRIVING OF FIXING PRESSURE CHANGING MECHANISM, IMAGE FORMING METHOD, AND RECORDING MEDIUM

INCORPORATION BY REFERENCE

This application is based upon, and claims the benefit of priority from, corresponding Japanese Patent Application No. 2015-109053 filed in the Japan Patent Office on May 28, 2015, the entire contents of which are incorporated herein by reference.

BACKGROUND

Unless otherwise indicated herein, the description in this section is not prior art to the claims in this application and is not admitted to be prior art by inclusion in this section.

A typical image forming apparatus (for example, a printer, a multifunction printer, or a multi-functional peripheral) includes an image reading unit, an image processing unit, an image forming unit, and a fixing unit. These ensure a copy function in the following sequence. The image reading unit reads an original document as an image to generate image data. The image processing unit executes a process that processes the generated image data to convert to reproducible color space with toners of the image forming apparatus. The image forming unit generates a toner image on a photoreceptor drum based on the color-converted image data to transfer to a printing paper. The fixing unit pressures and heats the printing paper where the toner image is transferred to fix the toner image to the printing paper.

SUMMARY

An image forming apparatus according to one aspect of the disclosure includes a fixing unit, an image reading unit, and a control unit. The fixing unit includes a first roller, a second roller, and a displacement mechanism that displaces at least one of the first roller and the second roller to form a nip portion. The image reading unit includes a scanning mechanism that scans by moving a carriage where a light source is mounted. The control unit executes a driving of the scanning mechanism and a driving of the displacement mechanism at different times.

These as well as other aspects, advantages, and alternatives will become apparent to those of ordinary skill in the art by reading the following detailed description with reference where appropriate to the accompanying drawings. Further, it should be understood that the description provided in this summary section and elsewhere in this document is intended to illustrate the claimed subject matter by way of example and not by way of limitation.

DETAILED DESCRIPTION

Figure 1:
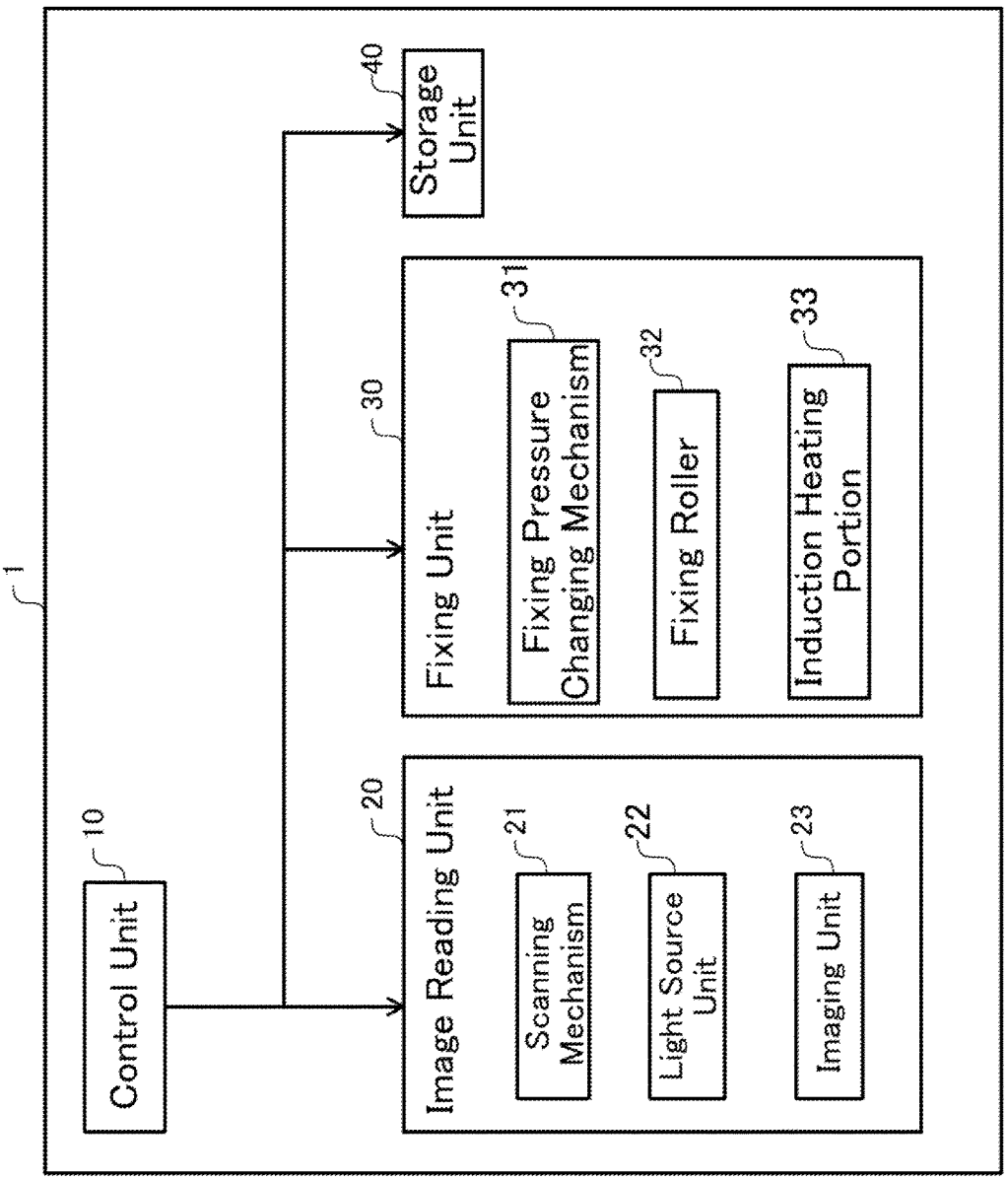
FIG. 1 illustrates a functional configuration of an image forming apparatus according to a first embodiment of the disclosure.

Example apparatuses are described herein. Other example embodiments or features may further be utilized, and other changes may be made, without departing from the spirit or scope of the subject matter presented herein. In the following detailed description, reference is made to the accompanying drawings, which form a part thereof.

The example embodiments described herein are not meant to be limiting. It will be readily understood that the aspects of the present disclosure, as generally described herein, and illustrated in the drawings, can be arranged, substituted, combined, separated, and designed in a wide variety of different configurations, all of which are explicitly contemplated herein.

The following describes embodiments of the disclosure (hereinafter referred to as, the "embodiments") with reference to the drawings.

FIG. 1 illustrates a functional configuration of an image forming apparatus 1 according to a first embodiment of the disclosure. The image forming apparatus 1 includes a control unit 10, an image reading unit 20, a fixing unit 30, and a storage unit 40. The image reading unit 20 includes a scanning mechanism 21, a light source unit 22, and an imaging unit 23. The fixing unit 30 includes a fixing pressure changing mechanism 31, a fixing roller 32, and an induction heating portion 33. The fixing pressure changing mechanism 31 is also referred to as a displacement mechanism.

The control unit 10 includes a main storage unit such as a RAM or a ROM, and a control unit such as a microprocessing unit (MPU) or a central processing unit (CPU). The control unit 10 includes a controller function related to an interface, such as various I/Os, USBs (universal serial buses), buses, and other hardware to control the entire image forming apparatus 1.

The storage unit 40, which is a storage device configured with a hard disk drive or a flash memory that are non-transitory recording medium, stores a control program and data of a process that the control unit 10 executes.

Figure 2:
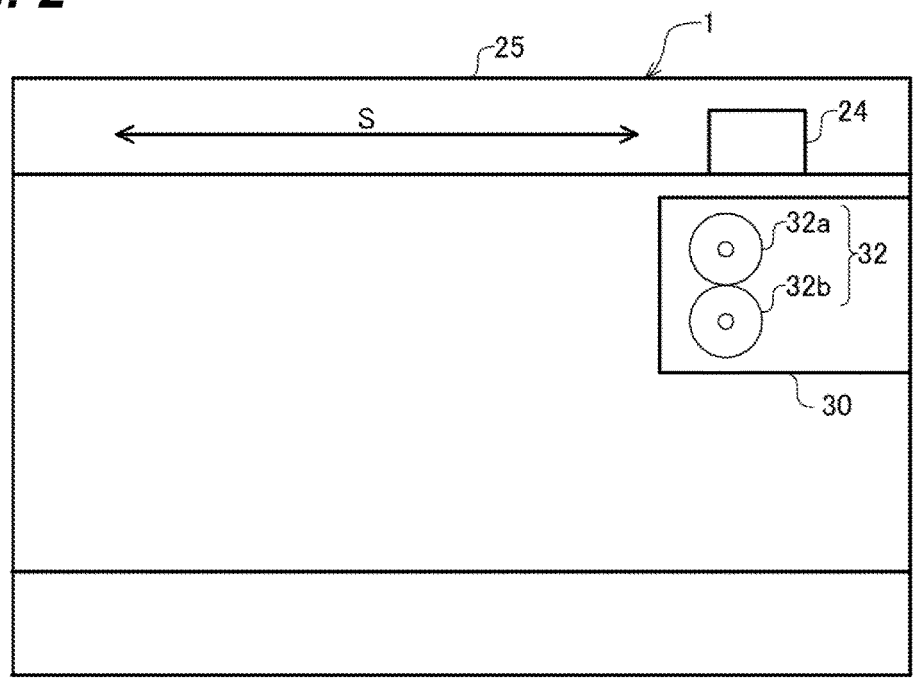
FIG. 2 illustrates an arrangement configuration of an image reading unit and a fixing unit on the image forming apparatus according to the first embodiment.

FIG. 2 illustrates an arrangement configuration of the image reading unit 20 and the fixing unit 30 on the image forming apparatus 1 according to the first embodiment. The image forming apparatus 1 includes an original document glass 25 where an original document (not illustrated) is placed. The image reading unit 20 includes a so-called contact image sensor (CIS) type image scanner. The original document is lighted by the light source unit 22. Reflected light from the original document enters the imaging unit 23 to be converted into an electrical signal. The light source unit 22 and the imaging unit 23 are mounted on a carriage 24. The carriage 24 is drove back and forth in a scanning direction S illustrated in FIG. 2 by the scanning mechanism 21. Thus, the image reading unit 20 reads the original document as an image to generate image data.

The control unit 10 executes a process that processes the generated image data to convert into reproducible color space with a toner that the image forming apparatus 1 includes. The control unit 10 generates a toner image on a photoreceptor drum (not illustrated) based on the color-converted image data to transfer to a printing paper.

The fixing roller 32 of the fixing unit 30 includes a pressure roller 32a and a heat roller 32b. The pressure roller 32a and the heat roller 32b, which pressure mutually to contact in deformed states, form a nip portion (not illustrated). The printing paper, when passing through this nip portion, is pressured and heated so that the toner is fixed. The pressure roller 32a is also referred to as a first roller. The heat roller 32b is also referred to as a second roller.

The heat roller 32b generally includes a cored bar roller with an Aluminum pipe, on which outer peripheral surface, a fluororesin layer or a silicon rubber layer is formed. On the other hand, the pressure roller 32a includes a metallic roller shaft, on which outer peripheral surface, a scrupulous elastically deformable silicon rubber layer with a thickness of a few millimeters is formed. With such configuration, a nip with an appropriate uniform width is formed within the fixing roller 32 using the elastic deformation of the pressure roller 32a. However, if such elastic deformation continues for an excessive long time, a permanent set occurs in the fixing roller 32 to be a cause of a fixing unevenness. In view of this, when a print job is not performed, or at a similar time, so that the pressure roller 32a and the heat roller 32b can be separated each other, the image forming apparatus 1 equips a following mechanism.

Figure 3:
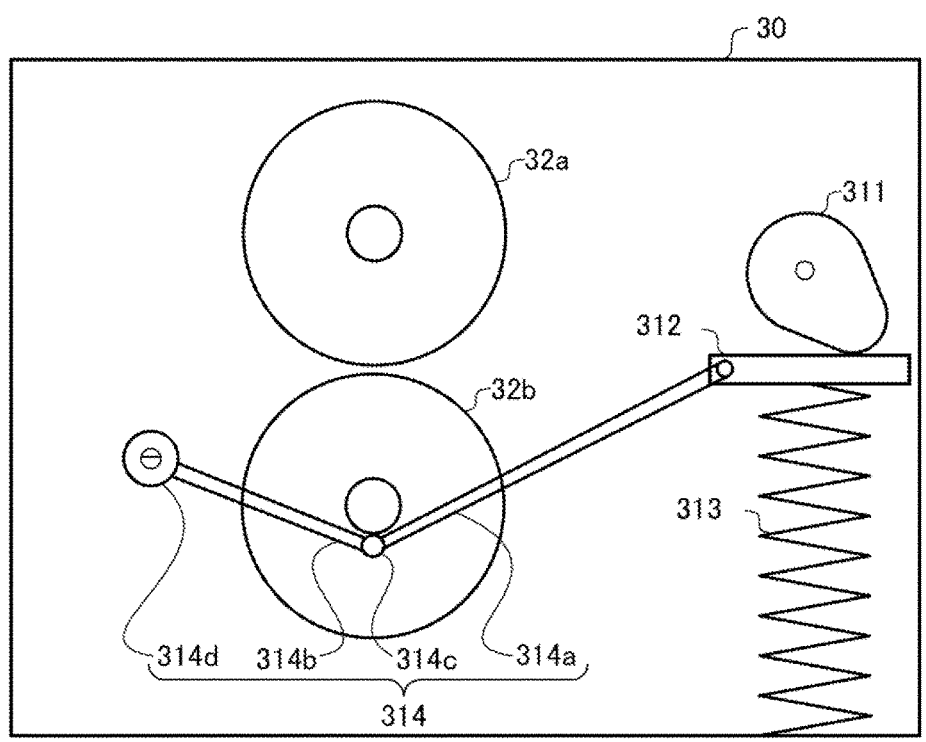
FIG. 3 illustrates a schematic configuration of a fixing pressure changing mechanism that the fixing unit includes according to the first embodiment.

FIG. 3 illustrates a schematic configuration of the fixing pressure changing mechanism 31 that the fixing unit 30 includes according to the first embodiment. The fixing unit 30 includes, in addition to the fixing roller 32 (pressure roller 32a and heat roller 32b), a pressurizing plate 312, a link mechanism 314 (314a, 314b, 314c, and 314d), a cam 311, and a pressurizing spring 313. The heat roller 32b can move, in response to movement of the link mechanism 314, in a direction approaching to a pressure roller 32a side, and in a direction separating from the pressure roller 32a side.

The link mechanism 314 includes a first link 314a, a second link 314b, a hinge 314c, and a fulcrum 314d. One end of the first link 314a is connected turnably to the pressurizing plate 312. The other end of the first link 314a and one end of the second link 314b are connected turnably via the hinge 314c. The other end of the second link 314b is secured turnably to the fulcrum 314d.

The link mechanism 314 operates as follows. That is, the pressurizing plate 312 is, in association with rotation of the cam 311, moved to a cam 311 side by a bias of the pressurizing spring 313. In this case, the pressurizing plate 312 moves the one end of the first link 314a to the cam 311 side. In association with this, the other end of the first link 314a also displaces to the pressure roller 32a side with the hinge 314c. Since the other end of the second link 314b is secured turnably to the fulcrum 314d, the hinge 314c connected to the one end of the second link 314b permits such displacement.

On the other hand, the cam 311 can rotate to cause the pressurizing plate 312 to displace in an opposite direction of a biasing direction of the pressurizing spring 313. With this displacement, the heat roller 32b can displace in a direction separating from the pressure roller 32a. This can suppress permanent-set generation of the fixing roller 32. Such mechanism, which is referred to as the fixing pressure changing mechanism 31, is generally equipped on a laser printer. As a result, the fixing unit 30 operates appropriately at a fixing process to contribute to an improvement of image quality.

However, the inventor of the disclosure overturned the common general knowledge to discover that the operation of the fixing pressure changing mechanism 31 used at the fixing process within an image forming process affects an image reading process.

Figure 4:
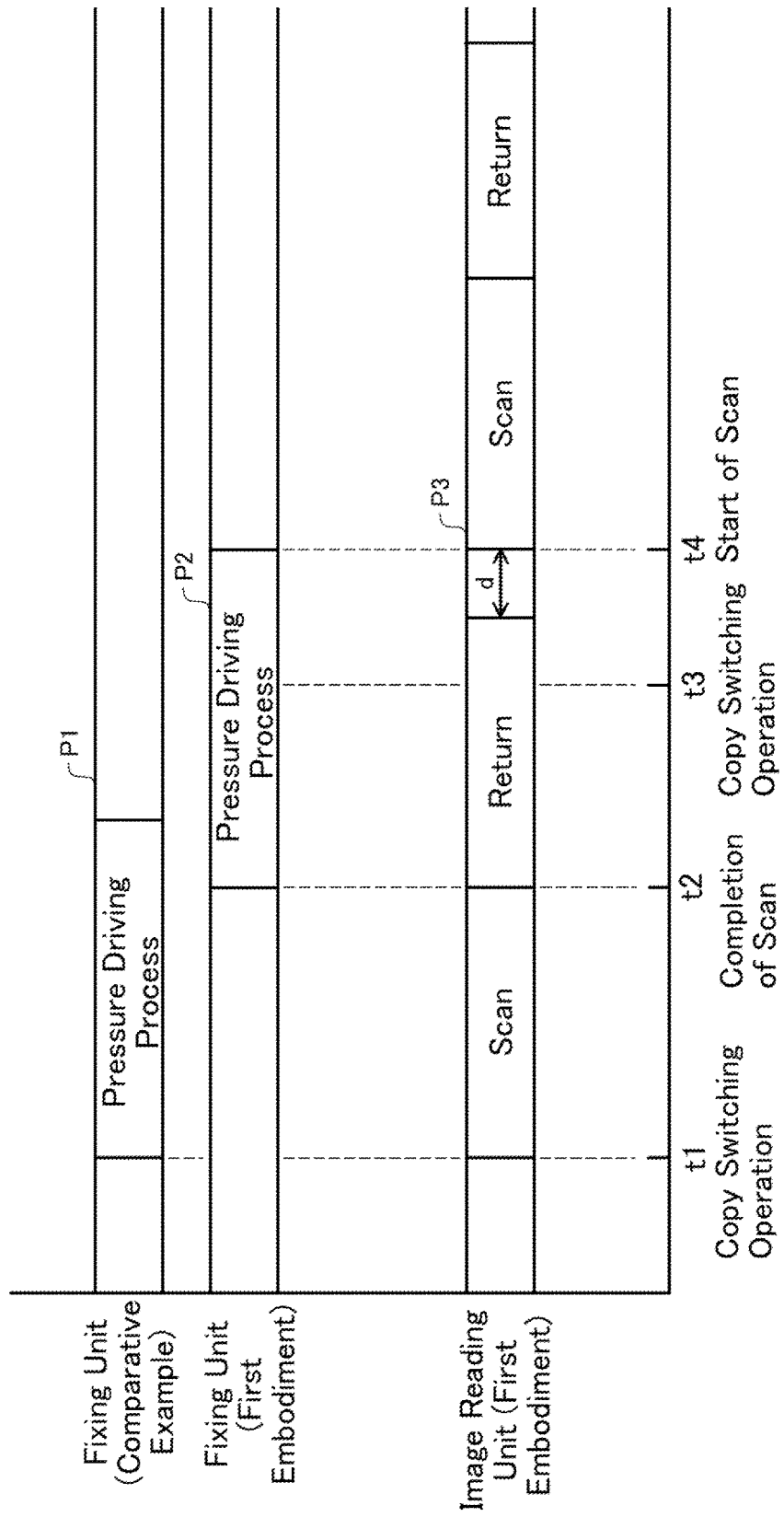
FIG. 4 illustrates an exemplary operation of the fixing unit and the image reading unit according to the first embodiment.

FIG. 4 is a timing chart that illustrates an exemplary operation of the fixing unit 30 and the image reading unit 20 according to the first embodiment. At this timing chart, the horizontal axis represents time, and operation contents of such as respective mechanisms are arranged in the direction of longitudinal axis. An operation content of the fixing pressure changing mechanism 31 according to a typical comparative example is represented as a time bar P1. An operation content of the fixing pressure changing mechanism 31 according to the embodiment is represented as a time bar P2. An operation content of the image reading unit 20 according to the embodiment is represented as a time bar P3.

On a control unit of a comparative example, If the control unit detects a copy switching operation (copy starting instruction) at a time t1, in the typical comparative example, the fixing unit 30 and the image reading unit 20 start operating almost simultaneously. The image reading unit 20 starts a move of the carriage 24 by the scanning mechanism 21. On the other hand, the fixing unit 30 starts simultaneously an operation of the fixing pressure changing mechanism 31. The fixing pressure changing mechanism 31 causes the cam 311 to rotate to change from a non-pressurizing state to a pressurizing state. The cam 311 drives the link mechanism 314 so that the heat roller 32b is displaced to the pressure roller 32a side. Thus, the heat roller 32b contacts the pressure roller 32a, and then is pressed by the pressure roller 32a.

The inventor of the disclosure found that, in this case, the operations of the cam 311 and the link mechanism 314 generate vibration, and thus color unevenness occurs on an image acquired by the imaging unit 23. The disclosure solves a problem arrived by such novel knowledge.

The control unit 10 of the embodiment is different from the control unit of the comparative example at the point where even if the control unit 10 of the embodiment detects the copy switching operation at the time t1, the control unit 10 of the embodiment retards the operating start of the fixing pressure changing mechanism 31 until when a scan has been completed (time t2). The inventor of the disclosure confirmed actually that this prevents a deterioration of image quality by an interaction of a driving of the scanning mechanism 21 and a driving of the fixing pressure changing mechanism 31. However, the control unit 10, at the time t2 (when the scan has been completed) starts the operation of the fixing pressure changing mechanism 31 at the same time as a return. Here, the scan is an operation, while reading the image by the imaging unit 23 from a preliminarily set initial position (which is also referred to as an image acquiring time), to move the carriage 24. The return is an operation, without reading the image (which is also referred to as a non-acquiring time), to drive the scanning mechanism 21 and move the carriage 24 in an opposite direction of scanning to return (reach) to the initial position.

The image forming apparatus 1, in response to the copy switching operation, starts a response which is sensible from outside by a user, that is, the driving of the scanning mechanism 21, without delaying. On the other hand, because the driving of the fixing pressure changing mechanism 31 is not an operation that the user expects in response to the copy switching operation, it is not a problem even if the driving of the fixing pressure changing mechanism 31 is not started immediately. As a result, the user can execute a copy operation without feeling stress.

Next, it is assumed that, for example, at a time t3, before the driving of the fixing pressure changing mechanism 31 (pressure driving process) has been completed, the copy switching operation had been executed. In this case, the control unit 10, after waiting the completion of the driving of the fixing pressure changing mechanism 31, that is, after waiting for only a time d after the completion of the return, starts the scan at a time t4. This can prevent the deterioration of image quality by the interaction of the driving of the scanning mechanism 21 and the driving of the fixing pressure changing mechanism 31. In addition, on a typical image forming apparatus, a driving time of the fixing pressure changing mechanism 31 and an operating time of the return are several seconds each. In view of this, even a model where the driving time of the fixing pressure changing mechanism 31 is longer than the operating time of the return, its difference (time d=operating time of fixing pressure changing mechanism—return time) is extremely short. As a result, the difference is often a delay such that the user hardly realize.

Figure 5:
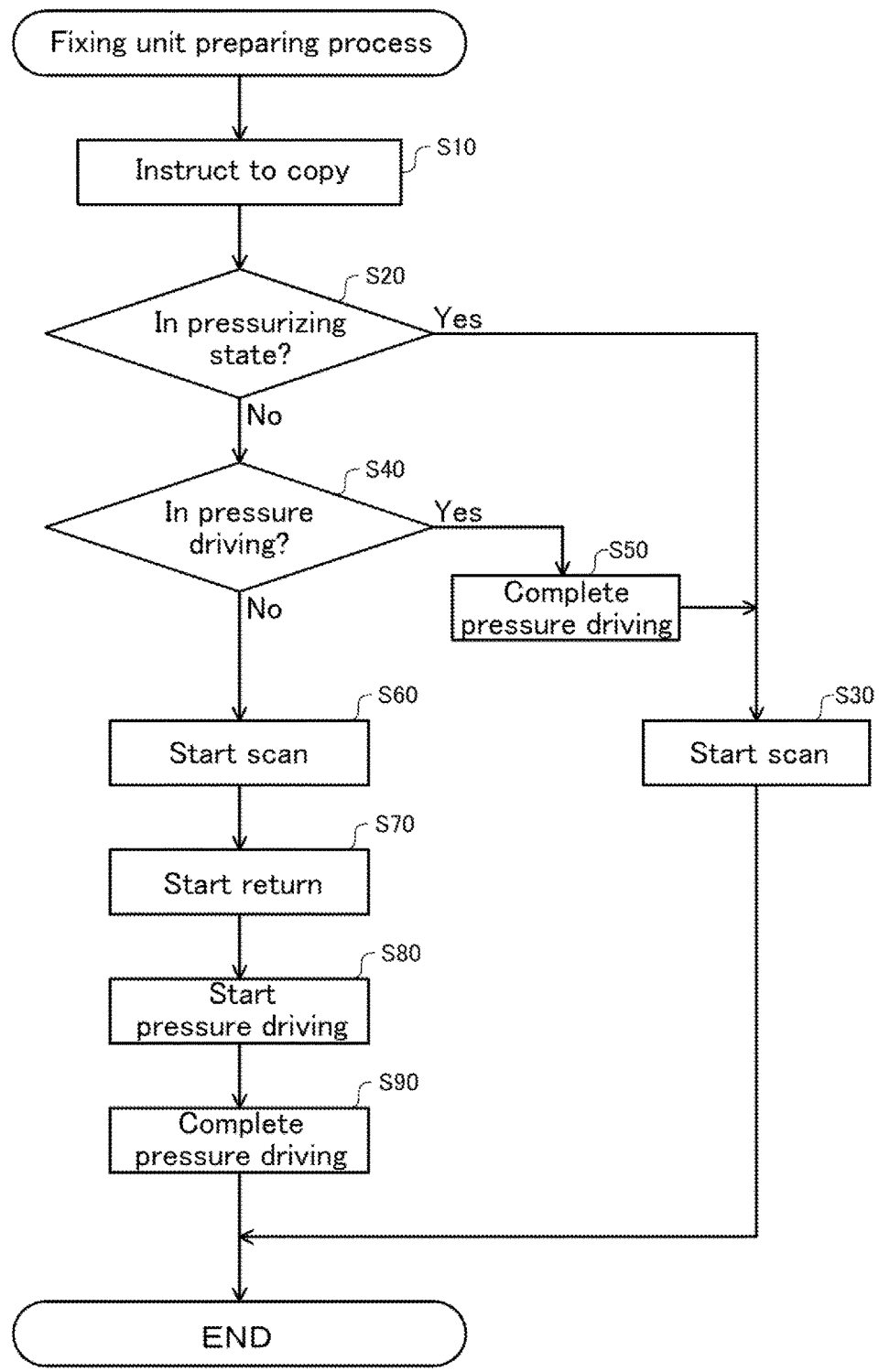
FIG. 5 illustrates an exemplary operation content for preparing the fixing unit according to the first embodiment.

FIG. 5 is a flowchart that illustrates an exemplary operation content of the fixing unit 30 and the image reading unit 20 according to the first embodiment. This flowchart illustrates a fixing unit preparing process, that is, a process that makes the fixing unit 30 to be in a fixable state, in relation to the operation of the image reading unit 20.

At Step S10, the control unit 10 detects the copy switching operation. This routine is a process initiated in response to the copy switching operation. At Step S20, the control unit 10 determines whether or not the fixing roller 32 that the fixing unit 30 includes is in the pressurizing state (state where the nip portion is formed). The control unit 10, when the fixing roller 32 is in the pressurizing state, proceeds the process to Step S30, when the fixing roller 32 is not in the pressurizing state, proceeds the process to Step S40.

At Step S30, the control unit 10, since the fixing roller 32 is in the pressurizing state, does not need to operate the fixing pressure changing mechanism 31, and immediately causes the scanning mechanism 21 to start the scan.

At Step S40, the control unit 10 determines whether the fixing pressure changing mechanism 31 is in operation or in non-operation (under suspension). The control unit 10, when the fixing pressure changing mechanism 31 is in operation, proceeds the process to Step S50, and when in non-operation, proceeds the process to Step S60.

At Step S50, the control unit 10 stands by until the pressure driving by the fixing pressure changing mechanism 31 has been completed. The control unit 10 starts the scan in response to the completion of the pressure driving (Step S30). That is, the control unit 10, when the fixing pressure changing mechanism 31 is in the pressure driving, after the pressure driving of the fixing pressure changing mechanism 31 has been completed, starts the scan (Step S30). This prevents the deterioration of image quality by the interaction of the driving of the scanning mechanism 21 and the driving of the fixing pressure changing mechanism 31. At the timing chart in FIG. 4, this process corresponds to the operation between the time t3 and the time t4.

At Step S60, the control unit 10 starts the scan immediately. At Step S70, the control unit 10 start the return in response to the completion of the scan, and in parallel to this, starts the pressure driving of the fixing pressure changing mechanism 31. At the timing chart in FIG. 4, this process corresponds to the operation at the time t2.

Thus, although the scanning mechanism 21 and the fixing pressure changing mechanism 31 drive simultaneously, since in the return where the image does not retrieved, the deterioration of image quality does not occur. In this way, if the pressure driving has been completed (Step S90), the fixing unit preparing process has been completed, and the fixing unit 30 becomes in the fixable state.

Thus, the control unit 10 according to the first embodiment, when the fixing roller 32 is in the pressurizing state, immediately starts the scan (Step S30), and when the fixing roller 32 is in the non-pressurizing state, executes a following process. That is, the control unit 10, in the pressure driving, starts the scan after the completion of the pressure driving (steps S50 and S30), and not in the pressure driving, starts the pressure driving after the scan. This, while suppressing a deterioration of copy function operability of the image forming apparatus 1, can reduce the deterioration of image quality caused by the simultaneous driving of the fixing pressure changing mechanism 31 and the scanning mechanism 21.

Figure 6:
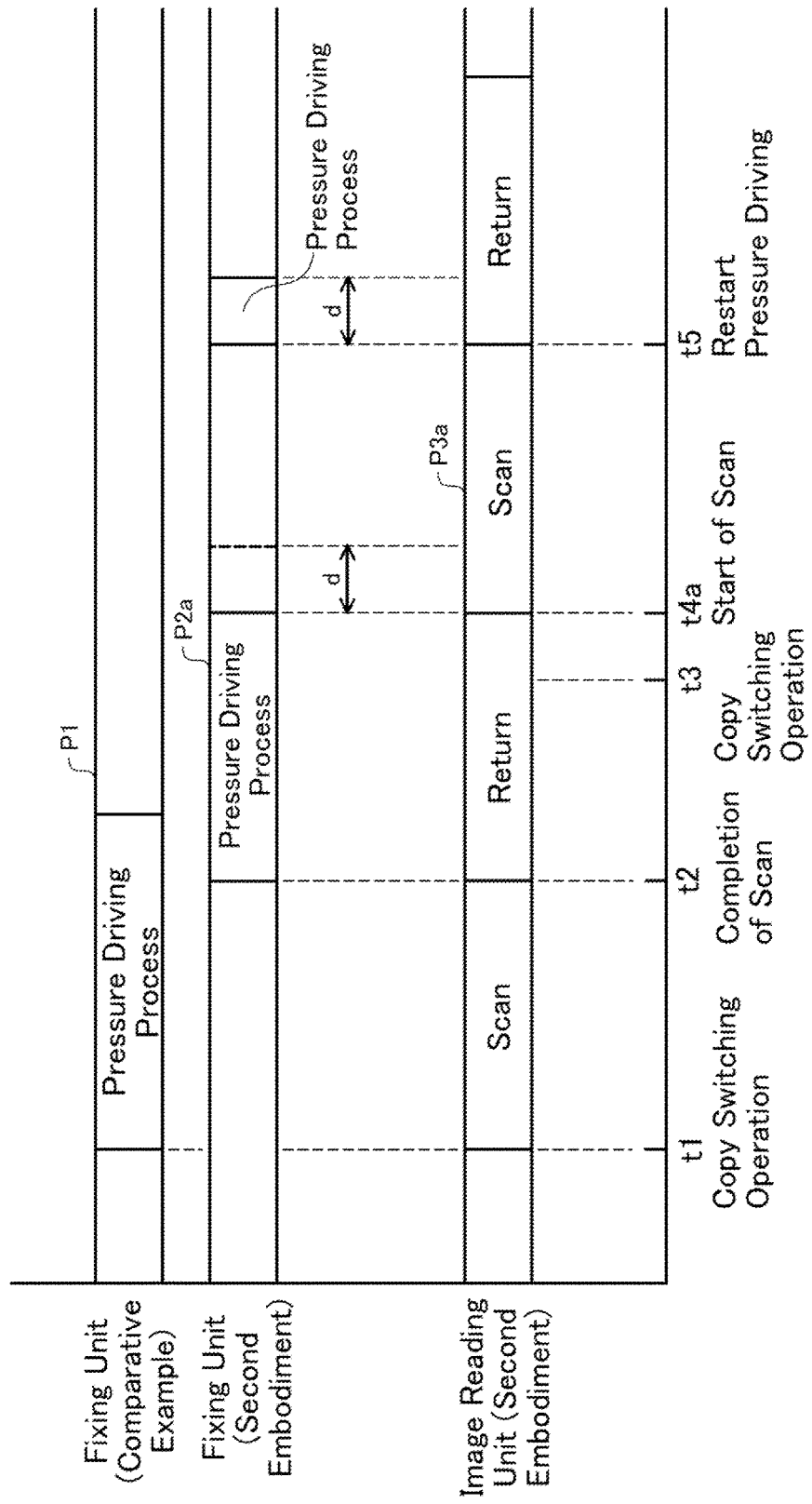
FIG. 6 illustrates an exemplary operation of a fixing unit and an image reading unit according to a second embodiment of the disclosure.

FIG. 6 illustrates an exemplary operation of the fixing unit 30 and the image reading unit 20 according to a second embodiment. At this timing chart, the horizontal axis represents time, and operation contents of such as respective mechanisms are arranged in the direction of longitudinal axis. An operation content of the fixing pressure changing mechanism 31 according to the second embodiment is represented as a time bar P2a. An operation content of the image reading unit 20 according to the embodiment is represented as a time bar P3a.

At the time bar P2a of the second embodiment, the fixing pressure changing mechanism 31 is different from the time bar P2 of the first embodiment at the point where the fixing pressure changing mechanism 31 halts the pressure driving process in response to the completion of the return. That is, at the time bar P2 of the first embodiment, the control unit 10, even if the return has been completed, keeps the scan waiting until the pressure driving process has been completed. In contrast to this, at the time bar P3a of the second embodiment, the scan starts immediately in response to the completion of the return. The pressure driving process, in a next return or in a time until a next copy operation is executed, executes a remaining process (pressure driving process at the time d) to complete.

This, in the second embodiment, can prevent the deterioration of image quality by the interaction of the driving of the scanning mechanism 21 and the driving of the fixing pressure changing mechanism 31 without delaying the start of the scan. Thus, the pressure driving process has not necessarily been completed within the time of return, and it is only necessary that at least a part of the process is executed.

Figure 7:
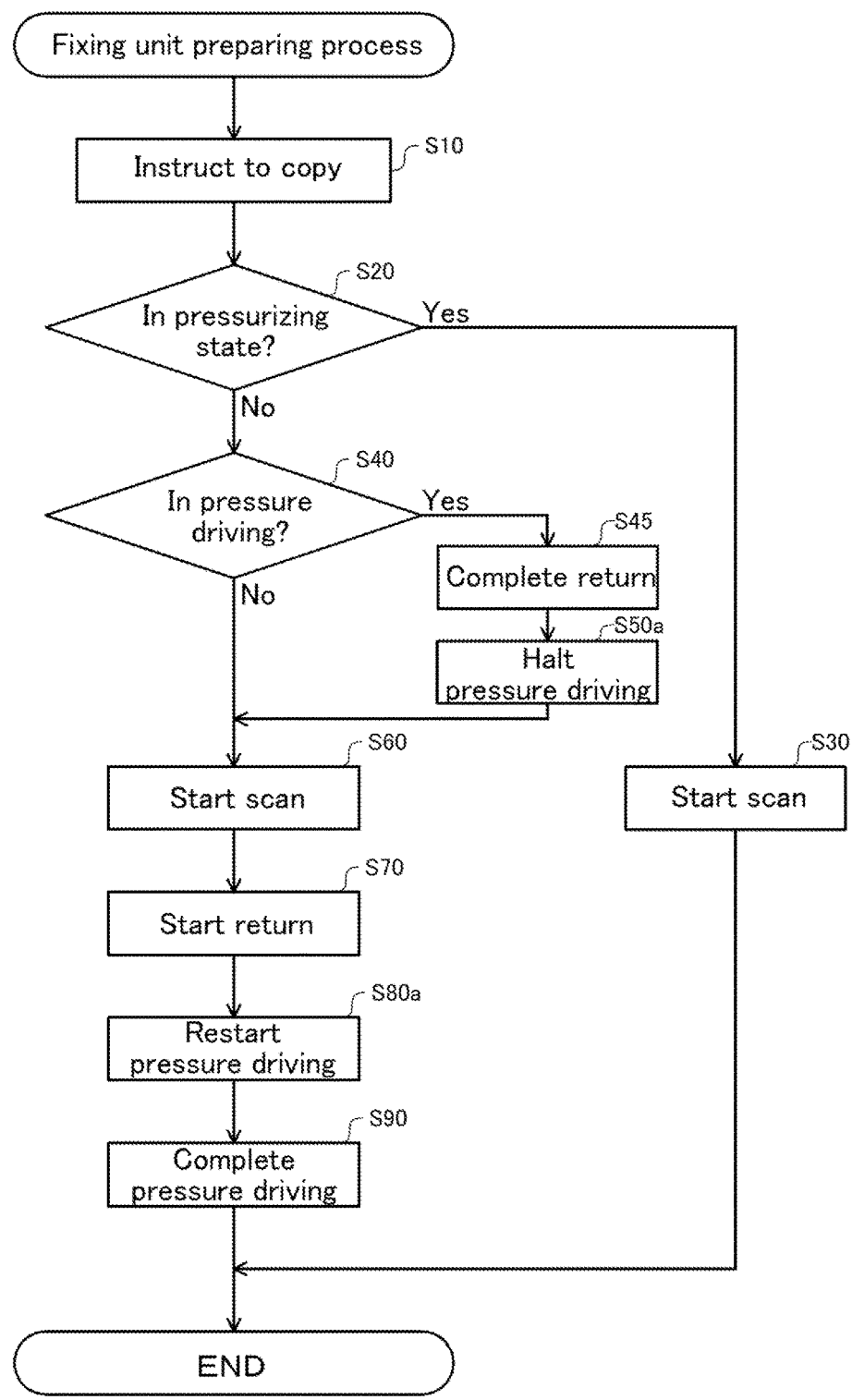
FIG. 7 illustrates an exemplary operation content for preparing the fixing unit according to the second embodiment.

FIG. 7 illustrates an exemplary operation content for preparing the fixing unit according to the second embodiment of the disclosure. A hardware configuration of the second embodiment is identical to the hardware configuration of the first embodiment. However, the second embodiment is different from the first embodiment at the point where Step S45 is added, Step S50 is changed to Step S50a, and Step S80 is changed to Step S80a.

At Step S50a, if the copy switching operation is detected in the pressure driving, the control unit 10 halts the pressure driving in its course in response to the completion of return (Step S45). In this point, Step S50a is different from Step S50 that keeps the scan waiting until the completion of the pressure driving. The halt of the pressure driving can be executed by controlling a motor (not illustrated) so as to, for example, halt the position of the cam 311 at any certain position. Step S80a is different from Step S80 at the point where the control unit 10, when the cam 311 is at a stop in its course, is set to restart to complete the pressure driving from its position (t5).

Thus, the second embodiment, if the copy switch is operated, except for in the return, halts the pressure driving, and then starts the scan. This ensures to execute the copy operation without generating the delay of the scan. As a result, without giving the user any operational stress, this, while suppressing the copy function operability of the image forming apparatus 1, can reduce the deterioration of image quality caused by the simultaneous driving of the fixing pressure changing mechanism 31 and the scanning mechanism 21.

The disclosure can be executed in not only the above-described respective embodiments but also following modifications.

Modification 1

The disclosure, which includes an automatic sheet feeding mechanism (not illustrated), can also apply to an image forming apparatus that an ADF scan is possible. The ADF scan is an image acquiring method that, while executing a paper feeding with the automatic sheet feeding mechanism (not illustrated), acquires the image. A table scan is an image acquiring method that places the original document on the original document glass 25 (see FIG. 2), and then causes the scanning mechanism 21 to move the imaging unit 23 (to scan) to acquire the image. At the ADF scan, since the scanning mechanism 21 does not operate, the deterioration of image quality by the interaction of the driving of the scanning mechanism 21 and the driving of the fixing pressure changing mechanism 31 does not occur.

When the disclosure is applied to an image forming apparatus that includes a function without a move of the carriage with the image acquisition, such as the ADF scan, the disclosure determines whether or not the image acquisition by the image reading unit 20 accompanies the move of the carriage, and then, based on this determination, when the image acquisition accompanies the move of the carriage, is preferably configured to restrict simultaneous operations.

While the above-described embodiments adopt the CIS type image scanner, and the light source unit and the imaging unit are mounted on the carriage, the disclosure is also applicable, for example, when a light source and a mirror are mounted on the carriage, such as a CCD type. The disclosure is applicable widely and generally to a configuration that causes the carriage to scan.

Modification 2

The disclosure can also apply to an image forming apparatus capable of both color printing and monochrome printing. In this case, only in the case of color printing, the image forming apparatus may be configured to restrict simultaneous operations of the driving of the scanning mechanism 21 and the fixing pressure changing mechanism 31. According to an experiment of the inventor, it is because that there are some cases that in the case of color printing, the deterioration of image quality by the interaction of the driving of the scanning mechanism 21 and the driving of the fixing pressure changing mechanism 31 is remarkable as out of color registration, and in the case of monochrome printing, the deterioration of image quality occur little.

Modification 3

At the above-described respective timing charts, it is assumed that warm-up of the image reading unit 20 has been completed. However, if the warm-up of the image reading unit 20 has not been completed, the pressure driving may be executed before its warm-up. That is, the image forming apparatus may be configured to complete the pressure driving preliminarily before the scan. Thus, the warm-up period of the image reading unit 20 can be utilized effectively.

Modification 4

Furthermore, when an exceptional reason has occurred such when, for example, a print job of a thick envelope has interrupted preferentially, the image forming apparatus may delay the scan to restrict the simultaneous operations of the driving of the scanning mechanism 21 and the driving of the fixing pressure changing mechanism 31. In addition, the image forming apparatus may shift both timings of the scan and the pressure driving.

Thus, it is only necessary that the disclosure is configured to shift at least one operation period of the pressure driving and the scan to restrict the simultaneous operations of the scan and the pressure driving. The image forming apparatus may also be configured to restrict the simultaneous operations of the scan and the non-pressure driving (driving to be the non-pressurizing state). In other words, in a predetermined condition, it is only necessary that the image forming apparatus is configured to execute displacements, such as the scan, the pressure driving, and the non-pressure driving, at mutually different times.

The disclosure is described above with the specific embodiments; however, the above-described embodiments are examples of the disclosure, and it is needless to say that the disclosure is not limited to the embodiments.

INDUSTRIAL APPLICABILITY

The disclosure is appropriate for a device such as an image forming apparatus; however, this should not be limited to the device. The disclosure is also applicable to a system where an application is installed.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An image forming apparatus comprising:
    a fixing unit that includes a first roller, a second roller, and a displacement mechanism that displaces at least one of the first roller and the second roller to form a nip portion;
    an image reading unit that includes a scanning mechanism that scans by moving a carriage where a light source is mounted; and
    a control unit that executes a driving of the scanning mechanism and a driving of the displacement mechanism; wherein
    the driving of the scanning mechanism includes moving the carriage from a preliminarily set initial position to a position where an image acquisition by the image reading unit is completed, and returning the carriage to the preliminarily set initial position; and
    the control unit executes at least a part of the driving of the displacement mechanism before the carriage returns to the preliminarily set initial position from the position where the image acquisition by the image reading unit is completed.

2. The image forming apparatus according to claim 1, wherein:

when detecting a copy start instruction during the driving of the displacement mechanism, and if the carriage is in its course to return to the initial position, the control unit starts the driving of the scanning mechanism after the driving of the displacement mechanism stops in response to an arrival at the initial position; and if the carriage is not in its course to return to the initial position, the control unit stops the driving of the displacement mechanism and then starts the driving of the scanning mechanism.

3. The image forming apparatus according to claim 1, wherein the control unit determines whether or not the image acquisition by the image reading unit accompanies the movement of the carriage, and when accompanying the movement of the carriage based on the determination, the control unit executes the at least a part of the driving of the displacement mechanism before the carriage returns to the preliminarily set initial position from the position where the image acquisition by the image reading unit is completed.

4. The image forming apparatus according to claim 1, wherein the control unit executes the at least a part of the driving of the displacement mechanism before the carriage returns to the preliminarily set initial position from the position where the image acquisition by the image reading unit is completed, in a case of a color printing, and permits execution of the driving of the displacement mechanism during the movement of the carriage from the initial position to the position where the image acquisition by the image reading unit is completed, in a case of a monochrome printing.

5. An image forming method for forming an image using an image forming apparatus, comprising:
preparing an image forming apparatus that includes a fixing unit and an image reading unit, the fixing unit including a first roller, a second roller, and a displacement mechanism that displaces at least one of the first roller and the second roller to form a nip portion, the image reading unit including a scanning mechanism that scans by moving a carriage where a light source is mounted; and
executing at least a part of a driving of the displacement mechanism before the carriage returns to a preliminarily set initial position from a position where an image acquisition by the image reading unit is completed.

6. A non-transitory computer-readable recording medium storing a control program controlling an image forming apparatus, the image forming apparatus comprising:
a fixing unit that includes a first roller, a second roller, and a displacement mechanism that displaces at least one of the first roller and the second roller to form a nip portion; and
an image reading unit that includes a scanning mechanism that scans by moving a carriage where a light source is mounted,
wherein the control program causes the image forming apparatus to function as a control unit that executes at least a part of a driving of the displacement mechanism before the carriage returns to a preliminarily set initial position from a position where an image acquisition by the image reading unit is completed.

* * * * *